(No Model.)

A. McLEOD.
MILK COOLER.

No. 373,242. Patented Nov. 15, 1887.

Witnesses:
John Grist,
C.G. Pennock

Inventor:
A. McLeod
By Henry Grist
Att'y.

N. PETERS, Photo-Lithographer, Washington, D. C.

United States Patent Office.

ANGUS McLEOD, OF NAPANEE, ONTARIO, CANADA, ASSIGNOR OF ONE-HALF TO WILLIAM TEMPLETON AND GEORGE M. BEEMAN, BOTH OF SAME PLACE.

MILK-COOLER.

SPECIFICATION forming part of Letters Patent No. 373,242, dated November 15, 1887.

Application filed July 16, 1887. Serial No. 244,483. (No model.)

*To all whom it may concern:*

Be it known that I, ANGUS McLEOD, of the town of Napanee, in the Province of Ontario, in the Dominion of Canada, have invented certain new and useful Improvements in Milk-Coolers; and I do hereby declare that the following is a full, clear, and exact description of the same, reference being had to the annexed drawings, in which—

Figure 1:
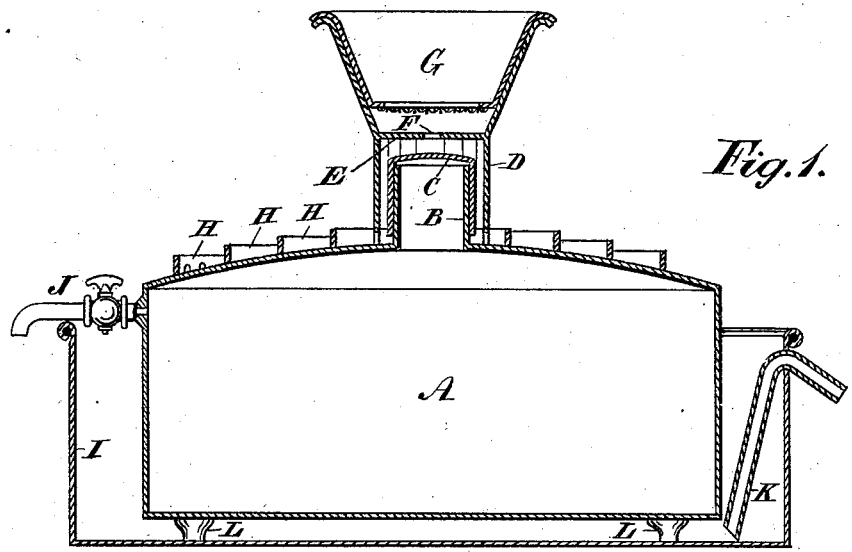
Figure 2:
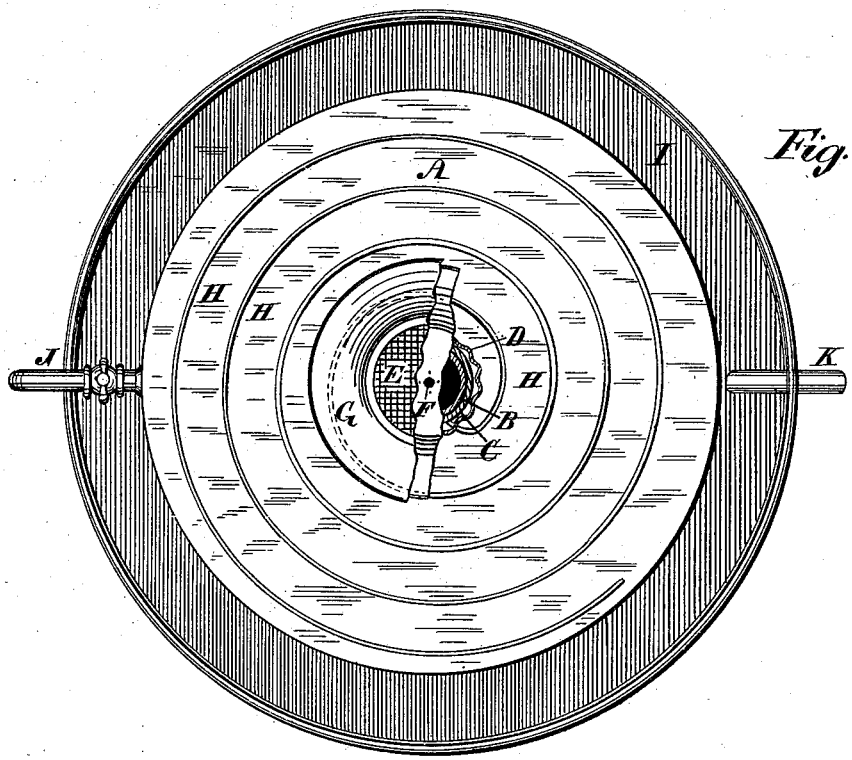

Figure 1 is a vertical section of my improved milk-cooler; and Fig. 2 is a top view of the same, a portion of the feeder being broken away to show the inlet to the tank.

My invention has for its object to strain, aerate, cool, and remove the animal heat from milk by a continuous operation and with great efficiency.

My invention consists of a strainer, a feeder, a tank, and a receiver, whereby the milk passing through the strainer flows into a volute channel on the top of a tank containing ice, salt, &c., to conduct the milk circuitously to a receiver in which the tank stands. The milk passing through the volute channel is cooled and collected in the receiver and passes out through an overflow-pipe arranged to take the milk from the bottom of the receiver.

A is a tank having a crowning top and an inlet at the summit provided with a collar, B, and cap C.

D is a funnel-shaped feeder having a sleeve surrounding cap C and collar B, whereby the feeder stands upon the apex of the tank, and said feeder is provided with a floor, E, having a central discharge-aperture, F, to flow the milk in a small stream over the top of the tank.

G is a removable strainer which fits into the feeder to remove foreign matter from the milk prior to being cooled.

The cooling-tank A is a closed receptacle to contain ice, water, salt, or other cooling matter, which matter is inserted through the inlet when the cap C and feeder D are removed.

The top or cover of tank A has on the outside a volute channel, H, extending from the feeder downwardly toward the circumferential wall of the tank, and near the termination thereof the wall of the channel is perforated to allow the milk to escape laterally from the channel and down the wall of the ice-tank into a receiver, I, surrounding the tank, and said tank is provided with feet L to raise it from the bottom of the receiver, whereby the milk will circulate under the bottom of the tank.

The tank is provided with a draw-off cock, J, to remove the contents when at too high a temperature and allow replacing the same with a colder element.

The receiver is provided with a pipe, K, to prevent overflow, and preferably the pipe rises from the bottom of the receiver to induce circulation under the tank and a downward current in the receiver.

I claim as my invention—

In a milk-cooler, the combination of the water-tank A, having a top or cover provided with a volute channel, H, on the outside, a collar, B, and removable cap C, a removable feeder, D, having a strainer and standing on the top of the cover at the upper end of said channel and surrounding the collar B, and a receiver, I, surrounding the tank, as set forth, for the purpose described.

ANGUS McLEOD.

Witnesses:
H. M. DEROCHE,
F. M. YOUNG.